United States Patent
Kitazawa et al.

(10) Patent No.: US 12,394,827 B2
(45) Date of Patent: Aug. 19, 2025

(54) BINDER COMPOSITION FOR NON-AQUEOUS SECONDARY BATTERY HEAT-RESISTANT LAYER, SLURRY COMPOSITION FOR NON-AQUEOUS SECONDARY BATTERY HEAT-RESISTANT LAYER, HEAT-RESISTANT LAYER FOR NON-AQUEOUS SECONDARY BATTERY, AND NON-AQUEOUS SECONDARY BATTERY

(71) Applicant: ZEON CORPORATION, Tokyo (JP)

(72) Inventors: Yuzo Kitazawa, Tokyo (JP); Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 712 days.

(21) Appl. No.: 17/635,766

(22) PCT Filed: Aug. 21, 2020

(86) PCT No.: PCT/JP2020/031739
§ 371 (c)(1),
(2) Date: Feb. 16, 2022

(87) PCT Pub. No.: WO2021/039673
PCT Pub. Date: Mar. 4, 2021

(65) Prior Publication Data
US 2022/0320605 A1    Oct. 6, 2022

(30) Foreign Application Priority Data

Aug. 30, 2019   (JP) ................................ 2019-158926

(51) Int. Cl.
*H01M 10/42*   (2006.01)
*C08K 3/22*    (2006.01)
*C08K 3/30*    (2006.01)
*C08L 33/20*   (2006.01)

(52) U.S. Cl.
CPC .......... *H01M 10/4235* (2013.01); *C08K 3/22* (2013.01); *C08K 3/30* (2013.01); *C08L 33/20* (2013.01); *C08K 2003/2227* (2013.01); *C08K 2003/3045* (2013.01)

(58) Field of Classification Search
CPC ..................................................... C08L 33/20
See application file for complete search history.

(56) References Cited

U.S. PATENT DOCUMENTS

| 10,756,322 | B2 | 8/2020 | Kim et al. | |
| 2013/0330622 | A1 | 12/2013 | Sasaki | |
| 2016/0013465 | A1 | 1/2016 | Akiike | |
| 2016/0049628 | A1* | 2/2016 | Kim .................... | H01M 10/052 |
| | | | | 29/623.5 |
| 2019/0165349 | A1 | 5/2019 | Kim et al. | |

FOREIGN PATENT DOCUMENTS

| CN | 109841784 A | | 6/2019 |
| EP | 2985813 A1 | | 2/2016 |
| JP | 2013145763 A | | 7/2013 |
| JP | 2019102453 A | | 6/2019 |
| KR | 20140124321 A | * | 10/2014 |
| KR | 1020190062924 A | | 6/2019 |
| WO | 2012115096 A1 | | 8/2012 |
| WO | 2014148577 A1 | | 9/2014 |

OTHER PUBLICATIONS

Nov. 2, 2020, International Search Report issued in the International Patent Application No. PCT/JP2020/031739.
Mar. 1, 2022, International Preliminary Report on Patentability issued in the International Patent Application No. PCT/JP2020/031739.
Dec. 9, 2024, the Extended European Search Report issued by the European Patent Office in the corresponding European Patent Application No. 20859613.0.

* cited by examiner

*Primary Examiner* — Michael F Pepitone
(74) *Attorney, Agent, or Firm* — KENJA IP LAW PC

(57) ABSTRACT

Provided is a binder composition for a non-aqueous secondary battery heat-resistant layer containing a particulate polymer that includes a cyano group-containing monomer unit and a hydroxyl group-containing monomer unit and for which a value ($M^{OH}/S$) obtained by dividing a value $M^{OH}$ of a mole fraction of the hydroxyl group-containing monomer unit in the particulate polymer by a value S ($\mu m^2$) of surface area of the particulate polymer is 0.40 or more.

7 Claims, No Drawings

BINDER COMPOSITION FOR NON-AQUEOUS SECONDARY BATTERY HEAT-RESISTANT LAYER, SLURRY COMPOSITION FOR NON-AQUEOUS SECONDARY BATTERY HEAT-RESISTANT LAYER, HEAT-RESISTANT LAYER FOR NON-AQUEOUS SECONDARY BATTERY, AND NON-AQUEOUS SECONDARY BATTERY

CROSS-REFERENCE TO RELATED APPLICATION

This application is a National Stage Application of PCT/JP2020/031739 filed Aug. 21, 2020, which claims priority based on Japanese Patent Application No. 2019-158926 filed Aug. 30, 2019. The disclosures of the prior applications are hereby incorporated by reference herein in their entirety.

TECHNICAL FIELD

The present disclosure relates to a binder composition for a non-aqueous secondary battery heat-resistant layer, a slurry composition for a non-aqueous secondary battery heat-resistant layer, a heat-resistant layer for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery typically includes battery members such as electrodes (positive electrode and negative electrode) and a separator that isolates the positive electrode and the negative electrode from each other. Battery members that include a protective layer for improving heat resistance (i.e., a heat-resistant layer) are conventionally used as such battery members.

A heat-resistant layer of a secondary battery may be a layer that is formed by binding non-conductive particles through a binder. Such a heat-resistant layer is normally formed by preparing a slurry composition (hereinafter, also referred to as a "slurry composition for a non-aqueous secondary battery heat-resistant layer" or simply as a "slurry composition for a heat-resistant layer") having non-conductive particles and a binder dissolved or dispersed in a dispersion medium such as water, and then applying the slurry composition for a heat-resistant layer onto a substrate such as a separator substrate or electrode substrate and drying the slurry composition for a heat-resistant layer.

In recent years, attempts have been made to improve binder compositions used in heat-resistant layer formation in order to achieve further improvement of secondary battery performance (for example, refer to Patent Literature (PTL) 1).

PTL 1 discloses a slurry for a lithium ion secondary battery porous membrane that contains non-conductive particles, a water-soluble polymer including an acidic group-containing monomer unit, and a particulate polymer, and in which the amount of the water-soluble polymer relative to the amount of the non-conductive particles is within a specific range, and the BET specific surface area of the non-conductive particles is within a specific range. More specifically, PTL 1 discloses a slurry for a porous membrane containing a water-soluble polymer, non-conductive particles, and a particulate polymer that is obtained through polymerization, under specific conditions, using a monomer composition that contains acrylonitrile as a nitrile group-containing monomer, butyl acrylate as a (meth)acrylic acid ester monomer, methacrylic acid as an ethylenically unsaturated acid monomer, and allyl glycidyl ether and N-methylolacrylamide as cross-linkable monomers. The slurry for a porous membrane disclosed in PTL 1 is capable of forming a porous membrane that can display heat resistance (i.e., a heat-resistant layer). Moreover, the slurry for a porous membrane disclosed in PTL 1 makes it possible to provide an obtained lithium ion secondary battery with excellent high-temperature cycle characteristics.

CITATION LIST

Patent Literature

PTL 1: WO2014/148577A1

SUMMARY

Technical Problem

However, there has been demand for further improvement of secondary battery performance in recent years, and the conventional slurry composition described above leaves room for improvement in terms of increasing close adherence between a heat-resistant layer that is formed using the slurry composition and a substrate (for example, a separator substrate or an electrode substrate) on which this heat-resistant layer is formed. More specifically, it would be beneficial for a slurry composition to be capable of increasing peel strength of an obtained heat-resistant layer and increasing close adherence between the heat-resistant layer and a substrate.

Accordingly, one object of the present disclosure is to provide a binder composition for a non-aqueous secondary battery heat-resistant layer with which it is possible to produce a slurry composition for a non-aqueous secondary battery heat-resistant layer that can form a heat-resistant layer for a non-aqueous secondary battery having sufficiently high peel strength.

Another object of the present disclosure is to provide a slurry composition for a non-aqueous secondary battery heat-resistant layer that can form a heat-resistant layer for a non-aqueous secondary battery having sufficiently high peel strength.

Yet another object of the present disclosure is to provide a heat-resistant layer for a non-aqueous secondary battery having sufficiently high peel strength and a non-aqueous secondary battery including this heat-resistant layer.

Solution to Problem

The inventors made extensive studies to solve the problem set forth above. The inventors discovered that it is possible to form a heat-resistant layer having sufficiently high peel strength when using a particulate polymer that includes a hydroxyl group-containing monomer unit and a cyano group-containing monomer unit and for which a value (parameter) obtained by dividing a value of the mole fraction constituted by the hydroxyl group-containing monomer unit in the particulate polymer by a value of the surface area of the particulate polymer satisfies a specific condition, and, in this manner, the inventors completed the present disclosure.

Specifically, the present disclosure aims to advantageously solve the problem set forth above, and a presently disclosed binder composition for a non-aqueous secondary battery heat-resistant layer comprises a particulate polymer, wherein the particulate polymer includes a cyano group-containing monomer unit and a hydroxyl group-containing monomer unit, and a value $M^{OH}/S$ obtained by dividing a value $M^{OH}$ of a mole fraction of the hydroxyl group-containing monomer unit in the particulate polymer by a value S of surface area of the particulate polymer in units of μm² is 0.40 or more. Through a binder composition containing a particulate polymer that includes a hydroxyl group-containing monomer unit and a cyano group-containing monomer unit and for which a value ($M^{OH}/S$) obtained through the specific calculation set forth above is 0.40 or more in this manner, it is possible to produce a slurry composition that can form a heat-resistant layer having sufficiently high peel strength.

Note that the phrase "includes a monomer unit" as used in relation to a polymer means that "a polymer obtained with the monomer includes a repeating unit derived from the monomer".

Moreover, the "mole fraction" of a given monomer unit (repeating unit) included in the polymer is the ratio of the number of moles of the given monomer unit included in the polymer when the total number of moles of all repeating units (all monomer units) included in the polymer is taken to be 1.

Also note that the "mole fraction" can be measured by a nuclear magnetic resonance (NMR) method such as $^1$H-NMR or $^{13}$C-NMR.

In the presently disclosed binder composition for a non-aqueous secondary battery heat-resistant layer, it is preferable that the particulate polymer has a volume-average particle diameter of 0.30 μm or less, and the mole fraction of the hydroxyl group-containing monomer unit in the particulate polymer is 0.02 or more. When the volume-average particle diameter of the particulate polymer is 0.30 μm or less and the mole fraction of the hydroxyl group-containing monomer unit in the particulate polymer is 0.02 or more, heat shrinkage resistance of an obtained heat-resistant layer can be increased, and cycle characteristics of an obtained secondary battery can be enhanced.

Note that the "volume-average particle diameter" of the particulate polymer refers to the "particle diameter (D50) at which, in a particle size distribution (by volume) measured by laser diffraction, cumulative volume calculated from a small diameter end of the distribution reaches 50%".

In the presently disclosed binder composition for a non-aqueous secondary battery heat-resistant layer, it is preferable that a mole fraction of the cyano group-containing monomer unit in the particulate polymer is 0.07 or less. When the mole fraction of the cyano group-containing monomer unit in the particulate polymer is 0.07 or less, heat shrinkage resistance of an obtained heat-resistant layer can be further increased.

In the presently disclosed binder composition for a non-aqueous secondary battery heat-resistant layer, it is preferable that the particulate polymer has a degree of swelling in electrolyte solution of a factor of 8.0 or less. When the degree of swelling in electrolyte solution of the particulate polymer is a factor of 8.0 or less, cycle characteristics of an obtained secondary battery can be enhanced.

Note that the "degree of swelling" is the degree of swelling in an electrolyte solution that is a solution obtained by dissolving $LiPF_6$ with a concentration of 1 mol/L in a mixed solvent of ethylene carbonate and ethyl methyl carbonate in a mass ratio of 3:7 and can be measured by a method described in the EXAMPLES section.

Moreover, the present disclosure aims to advantageously solve the problem set forth above, and a presently disclosed slurry composition for a non-aqueous secondary battery heat-resistant layer comprises: non-conductive particles; and any one of the binder compositions for a non-aqueous secondary battery heat-resistant layer set forth above. A slurry composition that contains non-conductive particles and any one of the binder compositions set forth above in this manner makes it possible to form a heat-resistant layer having sufficiently high peel strength.

In the presently disclosed slurry composition for a non-aqueous secondary battery heat-resistant layer, the non-conductive particles preferably have a volume-average particle diameter of 0.7 μm or less. When the non-conductive particles have a volume-average particle diameter of 0.7 μm or less, heat shrinkage resistance of an obtained heat-resistant layer can be increased.

Note that the "volume-average particle diameter" of the non-conductive particles refers to the "particle diameter (D50) at which, in a particle size distribution (by volume) measured by laser diffraction, cumulative volume calculated from a small diameter end of the distribution reaches 50%".

Furthermore, the present disclosure aims to advantageously solve the problem set forth above, and a presently disclosed heat-resistant layer for a non-aqueous secondary battery is formed using the slurry composition for a non-aqueous secondary battery heat-resistant layer set forth above. A heat-resistant layer that is formed from the slurry composition set forth above in this manner has sufficiently high peel strength.

Also, the present disclosure aims to advantageously solve the problem set forth above, and a presently disclosed non-aqueous secondary battery comprises the heat-resistant layer for a non-aqueous secondary battery set forth above. A secondary battery that includes a battery member having the heat-resistant layer set forth above in this manner has excellent battery characteristics.

Advantageous Effect

According to the present disclosure, it is possible to provide a binder composition for a non-aqueous secondary battery heat-resistant layer with which it is possible to produce a slurry composition for a non-aqueous secondary battery heat-resistant layer that can form a heat-resistant layer for a non-aqueous secondary battery having sufficiently high peel strength.

Moreover, according to the present disclosure, it is possible to provide a slurry composition for a non-aqueous secondary battery heat-resistant layer that can form a heat-resistant layer for a non-aqueous secondary battery having sufficiently high peel strength.

Furthermore, according to the present disclosure, it is possible to provide a heat-resistant layer for a non-aqueous secondary battery having sufficiently high peel strength and a non-aqueous secondary battery including this heat-resistant layer.

DETAILED DESCRIPTION

The following provides a detailed description of embodiments of the present disclosure.

The presently disclosed binder composition for a non-aqueous secondary battery heat-resistant layer can be used in production of the presently disclosed slurry composition for a non-aqueous secondary battery heat-resistant layer. Moreover, the presently disclosed slurry composition for a non-aqueous secondary battery heat-resistant layer can be used in formation of a heat-resistant layer of a non-aqueous secondary battery such as a lithium ion secondary battery. A feature of the presently disclosed heat-resistant layer for a non-aqueous secondary battery is that it is formed from the presently disclosed slurry composition for a non-aqueous secondary battery heat-resistant layer. Moreover, a feature of the presently disclosed non-aqueous secondary battery is that it includes a heat-resistant layer for a non-aqueous secondary battery that has been produced using the presently disclosed slurry composition for a non-aqueous secondary battery heat-resistant layer.

(Binder Composition for Non-Aqueous Secondary Battery Heat-Resistant Layer)

The presently disclosed binder composition contains a particulate polymer and can optionally further contain a dispersion medium and other components.

Features of the presently disclosed binder composition are that the aforementioned particulate polymer includes a hydroxyl group-containing monomer unit and a cyano group-containing monomer unit and that a value ($M^{OH}/S$) obtained by dividing a value $M^{OH}$ of the mole fraction of the hydroxyl group-containing monomer unit in the particulate polymer by a value S ($\mu m^2$) of the surface area of the particulate polymer is 0.40 or more.

As a result of the presently disclosed binder composition containing a particulate polymer that satisfies the specific properties set forth above, the presently disclosed binder composition can cause sufficiently strong adhesion of an obtained heat-resistant layer to a substrate, and thus can sufficiently increase peel strength of the heat-resistant layer. Although it is not clear why the above-described effect is obtained by using a binder composition that contains the specific particulate polymer set forth above in this manner, it is presumed to be due to a particulate polymer that includes a hydroxyl group-containing monomer unit in a frequency such that a value ($M^{OH}/S$) obtained by dividing a value $M^{OH}$ of the mole fraction of the hydroxyl group-containing monomer unit by a value S ($\mu m^2$) of the surface area of the particulate polymer is 0.40 or more being capable of strongly adhering to an adherend.

<Particulate Polymer>

The particulate polymer contained in the presently disclosed binder composition is a component that can function as a binder in a heat-resistant layer formed using a slurry composition, and is a component that can impart adhesiveness to a heat-resistant layer formed using a slurry composition containing the binder composition and that can hold non-conductive particles contained in the heat-resistant layer so that the non-conductive particles do not detach from the heat-resistant layer.

The particulate polymer is water-insoluble particles that are formed of a specific polymer. Note that when particles are referred to as "water-insoluble" in the present disclosure, this means that when 0.5 g of the polymer is dissolved in 100 g of water at a temperature of 25° C., insoluble content is 90 mass % or more.

The particulate polymer includes a cyano group-containing monomer unit and a hydroxyl group-containing monomer unit, and can optionally further include other monomer units. The following describes each of the various monomer units in detail.

<<Cyano Group-Containing Monomer Unit>>

The cyano group-containing monomer unit is a monomer unit that is obtained through polymerization of a cyano group-containing monomer. Examples of cyano group-containing monomers that can form the cyano group-containing monomer unit include α,β-unsaturated nitrile monomers such as acrylonitrile and methacrylonitrile. One of these cyano group-containing monomers may be used individually, or two or more of these cyano group-containing monomers may be used in combination in a freely selected ratio.

The mole fraction of the cyano group-containing monomer unit in the particulate polymer when the total number of moles of all repeating units included in the particulate polymer is taken to be 1 is preferably 0.07 or less, more preferably 0.06 or less, and even more preferably 0.05 or less. When the mole fraction of the cyano group-containing monomer unit in the particulate polymer is not more than any of the upper limits set forth above, heat shrinkage resistance of an obtained heat-resistant layer can be increased. Note that the mole fraction of the cyano group-containing monomer unit is required to be more than 0, and is preferably 0.01 or more. The presence of a cyano group-containing monomer unit during production of the particulate polymer can increase the stability of the particulate polymer during polymerization.

<<Hydroxyl Group-Containing Monomer Unit>>

The hydroxyl group-containing monomer unit is a monomer unit that is obtained through polymerization of a hydroxyl group-containing monomer. Examples of hydroxyl group-containing monomers that can form the hydroxyl group-containing monomer unit include hydroxyalkyl acrylates such as hydroxymethyl acrylate, hydroxymethyl methacrylate, β-hydroxyethyl acrylate, hydroxyethyl methacrylate, hydroxypropyl acrylate, hydroxypropyl methacrylate, hydroxybutyl acrylate, and hydroxybutyl methacrylate; and N-hydroxyalkylacrylamides such as N-hydroxymethylacrylamide (N-methylolacrylamide), N-hydroxymethylmethacrylamide (N-methylolmethacrylamide), N-hydroxyethylacrylamide, and N-hydroxyethylmethacrylamide. One of these hydroxyl group-containing monomers may be used individually, or two or more of these hydroxyl group-containing monomers may be used in combination in a freely selected ratio. Of these hydroxyl group-containing monomers, N-methylolacrylamide, β-hydroxyethyl acrylate, hydroxyethyl methacrylate, and N-hydroxyethylacrylamide are preferable, and N-methylolacrylamide and β-hydroxyethyl acrylate are more preferable.

The mole fraction of the hydroxyl group-containing monomer unit in the particulate polymer when the total number of moles of all repeating units included in the particulate polymer is taken to be 1 is preferably 0.02 or more, and more preferably 0.03 or more, and is preferably 0.10 or less, and more preferably 0.08 or less. When the mole fraction of the hydroxyl group-containing monomer unit in the particulate polymer is not less than any of the lower limits set forth above, cycle characteristics of an obtained secondary battery can be enhanced as a result of close adherence between an obtained heat-resistant layer and a substrate increasing. Moreover, when the mole fraction of the hydroxyl group-containing monomer unit in the particulate polymer is not more than any of the upper limits set forth above, polymerization stability during production of the particulate polymer can be increased.

<<Other Monomer Units>>

Examples of other monomers units include, but are not specifically limited to, a (meth)acrylic acid ester monomer unit, an acidic group-containing monomer unit, an ethylenically unsaturated carboxylic acid amide monomer unit, a cross-linkable monomer unit, an aromatic vinyl monomer unit, a fluorine atom-containing monomer unit, and an aliphatic conjugated diene monomer unit. Note that in the present specification, "(meth)acryl" is used to indicate "acryl" or "methacryl".

[(Meth)Acrylic Acid Ester Monomer Unit]

A (meth)acrylic acid ester monomer unit is a monomer unit that is obtained through polymerization of a (meth) acrylic acid ester monomer. Examples of alkyl (meth)acrylic acid ester monomers that can form a (meth)acrylic acid ester monomer unit include acrylates such as methyl acrylate, ethyl acrylate, n-propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, 2-methoxyethyl acrylate, 2-ethoxyethyl acrylate, hexyl acrylate, nonyl acrylate, lauryl acrylate, stearyl acrylate, and benzyl acrylate; and methacrylates such as methyl methacrylate, ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate, and benzyl methacrylate. One of these (meth)acrylic acid ester monomers may be used individually, or two or more of these (meth)acrylic acid ester monomers may be used in combination in a freely selected ratio. Of these examples, n-butyl acrylate and 2-ethylhexyl acrylate are preferable as (meth) acrylic acid ester monomers.

In a case in which the particulate polymer includes a (meth)acrylic acid ester monomer unit, the mole fraction of the (meth)acrylic acid ester monomer unit in the particulate polymer when the total number of moles of all repeating units included in the particulate polymer is taken to be 1 is preferably more than 0.5, and more preferably 0.6 or more, and is preferably less than 0.98, more preferably 0.95 or less, and even more preferably 0.93 or less. When the mole fraction of a (meth)acrylic acid ester monomer unit in the particulate polymer is within any of the ranges set forth above, peel strength of an obtained heat-resistant layer can be further increased. Note that a particulate polymer in which the mole fraction of a (meth)acrylic acid ester monomer unit is more than 0.5 is referred to as a (meth)acrylic acid ester copolymer in the present specification.

[Acidic Group-Containing Monomer Unit]

An acidic group-containing monomer unit is a monomer unit that is obtained through polymerization of an acidic group-containing monomer. The acidic group may be an acidic functional group such as a —COOH group (carboxy group), an —SO$_3$H group (sulfo group), or a phosphate group (for example, a —PO$_3$H$_2$ group or a —PO(OH)(OR) group, where R represents a hydrocarbon group), for example. Accordingly, examples of acidic group-containing monomers that can form an acidic group-containing monomer unit include monomers that include any of these acidic groups. Moreover, a monomer that can produce an acidic group such as described above through hydrolysis, for example, may be used as an acidic group-containing monomer. Specific examples of such acidic group-containing monomers include acid anhydrides that can produce a carboxy group through hydrolysis. One of the various acidic group-containing monomers listed below may be used individually, or two or more of the various acidic group-containing monomers listed below may be used in combination in a freely selected ratio.

Examples of monomers that include a carboxy group include monocarboxylic acids, dicarboxylic acids, anhydrides of dicarboxylic acids, and derivatives of any thereof. Examples of monocarboxylic acids include acrylic acid, methacrylic acid, crotonic acid, 2-ethylacrylic acid, and isocrotonic acid. Examples of dicarboxylic acids include carboxy group-containing monomers such as maleic acid, fumaric acid, itaconic acid, and methylmaleic acid. Examples of acid anhydrides of dicarboxylic acids include maleic anhydride, acrylic anhydride, methylmaleic anhydride, and dimethylmaleic anhydride.

Examples of monomers that include a sulfo group include sulfo group-containing monomers such as vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, 3-allyloxy-2-hydroxypropane sulfonic acid, and 2-(N-acryloyl)amino-2-methyl-1,3-propane-disulfonic acid.

Examples of monomers that include a phosphate group such as a —PO$_3$H$_2$ group or a —PO(OH)(OR) group (R represents a hydrocarbon group) include phosphate group-containing monomers such as 2-(meth)acryloyloxy ethyl phosphate, methyl-2-(meth)acryloyloxyethyl phosphate, and ethyl-(meth)acryloyloxyethyl phosphate. In the present specification, "(meth)acryloyl" is used to indicate "acryloyl" or "methacryloyl".

Note that a salt of any of the various monomers described above can be used as an acidic group-containing monomer. Of the acidic group-containing monomers described above, it is preferable to use a carboxy group-containing monomer, more preferable to use a monocarboxylic acid such as described above, and particularly preferable to use methacrylic acid.

In a case in which the particulate polymer includes an acidic group-containing monomer unit, the mole fraction of the acidic group-containing monomer unit in the particulate polymer when the total number of moles of all repeating units included in the particulate polymer is taken to be 1 is preferably not less than 0.01 and not more than 0.1. When the mole fraction of an acidic group-containing monomer unit in the particulate polymer is within the range set forth above, heat shrinkage resistance of an obtained heat-resistant layer can be further increased.

[Ethylenically Unsaturated Carboxylic Acid Amide Monomer Unit]

An ethylenically unsaturated carboxylic acid amide monomer unit is a monomer unit that is obtained through polymerization of an ethylenically unsaturated carboxylic acid amide monomer. Examples of ethylenically unsaturated carboxylic acid amide monomers include acrylamide, methacrylamide, N-methoxymethylacrylamide, and N-methoxymethylmethacrylamide. One of these ethylenically unsaturated carboxylic acid amide monomers may be used individually, or two or more of these ethylenically unsaturated carboxylic acid amide monomers may be used in combination in a freely selected ratio. Of these ethylenically unsaturated carboxylic acid amide monomers, acrylamide and methacrylamide are preferable, and acrylamide is more preferable.

In a case in which the particulate polymer includes an ethylenically unsaturated carboxylic acid amide monomer unit, the mole fraction of the ethylenically unsaturated carboxylic acid amide monomer unit in the particulate polymer when the total number of moles of all repeating units included in the particulate polymer is taken to be 1 is preferably 0.01 or more, and more preferably 0.02 or more, and is preferably 0.1 or less, and more preferably 0.08 or less. When the mole fraction of an ethylenically unsaturated carboxylic acid amide monomer unit in the particulate polymer is within any of the ranges set forth above, peel strength of an obtained heat-resistant layer can be further increased.

[Cross-Linkable Monomer Unit]

A cross-linkable monomer unit is a structural unit having a structure formed through polymerization of a cross-linkable monomer. Moreover, a cross-linkable monomer is a monomer that can form a cross-linked structure during or after polymerization upon instigation by heating, energy beam irradiation, or the like. More specifically, the cross-linkable monomer may be a cross-linkable monomer that includes a thermally cross-linkable group and one olefinic double bond per molecule (hereinafter, also referred to as "cross-linkable monomer 1"), a cross-linkable monomer that includes two or more olefinic double bonds per molecule (hereinafter, also referred to as "cross-linkable monomer 2"), or the like. One of these cross-linkable monomers may be used individually, or two or more of these cross-linkable monomers may be used in combination in a freely selected ratio. Note that the term "cross-linkable monomer unit" does not include monomer units corresponding to the various types of monomer units described above and hereafter.

Examples of thermally cross-linkable groups that can be included in the cross-linkable monomer 1 include an epoxy group, an oxetanyl group, an oxazoline group, and combinations thereof. Specific examples of the cross-linkable monomer 1 that have an epoxy group as a thermally cross-linkable group include glycidyl acrylate and glycidyl methacrylate.

Examples of the cross-linkable monomer 2 include allyl (meth)acrylate, ethylene glycol di(meth)acrylate, diethylene glycol di(meth)acrylate, triethylene glycol di(meth)acrylate, and tetraethylene glycol di(meth)acrylate. Note that in the present specification, "(meth)acrylate" is used to indicate "acrylate" or "methacrylate". Of these cross-linkable monomers, allyl (meth)acrylate is preferable, and allyl methacrylate is more preferable.

In a case in which the particulate polymer includes a cross-linkable monomer unit, the mole fraction of the cross-linkable monomer unit in the particulate polymer when the total number of moles of all repeating units included in the particulate polymer is taken to be 1 is preferably not less than 0.001 and not more than 0.1. When the mole fraction of a cross-linkable monomer unit in the particulate polymer is within the range set forth above, cycle characteristics of an obtained secondary battery can be improved.

[Aromatic Vinyl Monomer Unit]

An aromatic vinyl monomer unit is a monomer unit that is obtained through polymerization of an aromatic vinyl monomer. Examples of aromatic vinyl monomers include, but are not specifically limited to, styrene, α-methylstyrene, vinyltoluene, and divinylbenzene. One of these aromatic vinyl monomers may be used individually, or two or more of these aromatic vinyl monomers may be used in combination in a freely selected ratio. Of these examples, styrene is preferable as an aromatic vinyl monomer.

In a case in which the particulate polymer includes an aromatic vinyl monomer unit, the mole fraction of the aromatic vinyl monomer unit in the particulate polymer when the total number of moles of all repeating units included in the particulate polymer is taken to be 1 is preferably not less than 0.1 and not more than 0.3. When the mole fraction of an aromatic vinyl monomer unit in the particulate polymer is within the range set forth above, heat shrinkage resistance of an obtained heat-resistant layer can be increased.

[Fluorine Atom-Containing Monomer Unit]

A fluorine atom-containing monomer unit is a monomer unit that is obtained through polymerization of a fluorine atom-containing monomer. Examples of fluorine atom-containing monomers include vinylidene fluoride, tetrafluoroethylene, hexafluoropropylene, chlorotrifluoroethylene, vinyl fluoride, and perfluoroalkyl vinyl ethers. One of these fluorine atom-containing monomers may be used individually, or two or more of these fluorine atom-containing monomers may be used in combination in a freely selected ratio.

[Aliphatic Conjugated Diene Monomer Unit]

An aliphatic conjugated diene monomer unit is a monomer unit that is obtained through polymerization of an aliphatic conjugated diene monomer. Examples of aliphatic conjugated diene monomers include 1,3-butadiene, 2-methyl-1,3-butadiene, 2,3-dimethyl-1,3-butadiene, and 2-chloro-1,3-butadiene. One of these aliphatic conjugated diene monomers may be used individually, or two or more of these aliphatic conjugated diene monomers may be used in combination in a freely selected ratio.

<<Properties>>

[Parameter $M^{OH}/S$]

A value ($M^{OH}/S$) obtained by dividing a value $M^{OH}$ of the mole fraction of the hydroxyl group-containing monomer unit in the particulate polymer by a value S ($\mu m^2$) of the surface area of the particulate polymer is required to be 0.40 or more. When the value of the parameter $M^{OH}/S$ is 0.40 or more, peel strength of an obtained heat-resistant layer can be sufficiently increased. Moreover, the value of the parameter $M^{OH}/S$ is more preferably 0.45 or more from a viewpoint of further enhancing the balance of peel strength of an obtained heat-resistant layer, heat shrinkage resistance, and cycle characteristics.

[Volume-Average Particle Diameter]

The volume-average particle diameter of the particulate polymer is preferably 0.08 μm or more, and more preferably 0.10 μm or more, and is preferably 0.30 μm or less, more preferably 0.25 μm or less, even more preferably 0.20 μm or less, and particularly preferably 0.18 μm or less. When the volume-average particle diameter of the particulate polymer is not less than any of the lower limits set forth above, air permeability of an obtained heat-resistant layer can be inhibited from excessively decreasing, and rate characteristics of an obtained secondary battery can be enhanced. Moreover, when the volume-average particle diameter of the particulate polymer is not more than any of the upper limits set forth above, heat shrinkage resistance of an obtained heat-resistant layer can be increased.

The volume-average particle diameter of the particulate polymer can be adjusted by altering the type and/or amount of a monomer, polymerization initiator, and/or polymerization accelerator used in production of the particulate polymer, for example.

[Degree of Swelling in Electrolyte Solution]

The degree of swelling in electrolyte solution of the particulate polymer is preferably a factor of 8.0 or less, more preferably a factor of 4.5 or less, even more preferably a factor of 4.2 or less, and particularly preferably a factor of 4.0 or less. Note that the degree of swelling in electrolyte solution of the particulate polymer is normally more than a factor of 1.0, and preferably a factor of 1.5 or more. When the degree of swelling of the particulate polymer is not more than any of the upper limits set forth above, cycle characteristics of an obtained secondary battery can be enhanced. Moreover, when the degree of swelling of the particulate polymer satisfies any of the lower limits set forth above, rate characteristics of an obtained secondary battery can be enhanced.

<<Production Method of Particulate Polymer>>

The polymerization method of the particulate polymer is not specifically limited and may, for example, be any of solution polymerization, suspension polymerization, bulk polymerization, emulsion polymerization, or the like. Moreover, the polymerization reaction may be addition polymerization such as ionic polymerization, radical polymerization, or living radical polymerization. The polymerization may be carried out with a commonly used polymerization solvent, emulsifier, dispersant, polymerization initiator, chain transfer agent, or the like, and the amount thereof may also be the same as commonly used.

No specific limitations are placed on the content of the particulate polymer in the presently disclosed binder composition.

<Dispersion Medium>

The dispersion medium that can optionally be contained in the presently disclosed binder composition may be water, an organic solvent (for example, an ester, ketone, or alcohol), or a mixture thereof. Note that the presently disclosed binder composition may contain one organic solvent or may contain two or more organic solvents. Of these examples, water is preferable as the dispersion medium.

<Other Components>

The presently disclosed binder composition may contain water-soluble polymers, reinforcing materials, leveling agents, wetting agents, dispersants, viscosity modifiers, additives for electrolyte solution, preservatives, fungicides, defoamers, polymerization inhibitors, and binders other than the particulate polymer described above. Commonly known examples of such components can be used without any specific limitations so long as they do not affect battery reactions. One other component may be used individually, or two or more other components may be used in combination in a freely selected ratio.

A water-soluble polymer that can optionally be contained in the binder composition for a non-aqueous secondary battery heat-resistant layer is a component that can function as a viscosity modifier in the binder composition and in a slurry composition that contains the binder composition.

Note that when a polymer is referred to as "water-soluble" in the present disclosure, this means that when 0.5 g of the polymer is dissolved in 100 g of water at a temperature of 25° C., insoluble content is less than 1.0 mass %.

Various thickening polysaccharides can be used as the water-soluble polymer without any specific limitations. Carboxymethyl cellulose, methyl cellulose, hydroxypropyl cellulose, hydroxyethyl methyl cellulose, polyvinyl alcohol, polyacrylic acid, and salts thereof are preferable as thickening polysaccharides, and carboxymethyl cellulose and salts thereof are particularly preferable as thickening polysaccharides.

The carboxymethyl cellulose salt may be a sodium salt, an ammonium salt, or the like, for example. One thickening polysaccharide may be used individually, or two or more thickening polysaccharides may be used in combination in a freely selected ratio.

Examples of wetting agents that can optionally be contained in the binder composition for a non-aqueous secondary battery heat-resistant layer include, but are not specifically limited to, ethylene oxide/propylene oxide surfactants (EO/PO surfactants), fluorine-containing surfactants, silicon-containing surfactants, and so forth. Of these wetting agents, EO/PO surfactants and fluorine-containing surfactants are preferable, and EO/PO surfactants are more preferable.

Examples of dispersants that can be used include, but are not specifically limited to, polycarboxylic acids such as polyacrylic acid, sodium polycarboxylates such as sodium polyacrylate, ammonium polycarboxylates such as ammonium polyacrylate, polycarboxylic acid-sulfonic acid copolymers, sodium polycarboxylate-sulfonate copolymers, and ammonium polycarboxylate-sulfonate copolymers. Of these dispersants, sodium polyacrylate is preferable.

Specific examples of other components besides the wetting agents and dispersants described above include, but are not specifically limited to, those described in WO2012/115096A1, for example.

<Production of Binder Composition for Non-Aqueous Secondary Battery Heat-Resistant Layer>

The presently disclosed binder composition can be produced by using a known method to mix the previously described particulate polymer and other optional components as necessary. Specifically, the binder composition can be produced by mixing the above-described components using a mixer such as a ball mill, a sand mill, a bead mill, a pigment disperser, a grinding machine, an ultrasonic disperser, a homogenizer, a planetary mixer, or a FILMIX.

Note that in a case in which the particulate polymer is produced through polymerization in an aqueous solution, for example, a water dispersion of the particulate polymer can be used in that form as the binder composition.

(Slurry Composition for Non-Aqueous Secondary Battery Heat-Resistant Layer)

The presently disclosed slurry composition is a composition that is for use in forming a heat-resistant layer, that contains non-conductive particles and the binder composition set forth above, and that optionally further contains other components. In other words, the presently disclosed slurry composition normally contains non-conductive particles, a particulate polymer, and a dispersion medium, and optionally further contains other components. As a result of containing the binder composition set forth above, the presently disclosed slurry composition can form a heat-resistant layer having sufficiently high peel strength.

<Non-Conductive Particles>

The non-conductive particles contained in the slurry composition for a heat-resistant layer are not specifically limited and may be particles formed of an inorganic material (i.e., non-conductive inorganic particles) or particles formed of an organic material (i.e., non-conductive organic particles) that are electrochemically stable and are stably present in the environment of use of a secondary battery. Of these non-conductive particles, non-conductive inorganic particles are preferable. Preferable examples of non-conductive inorganic particles include particles of inorganic oxides such as aluminum oxide (alumina, $Al_2O_3$), hydrous aluminum oxide (boehmite, AlOOH), gibbsite ($Al(OH)_3$), silicon oxide, magnesium oxide (magnesia), magnesium hydroxide, calcium oxide, titanium oxide (titania), barium titanate ($BaTiO_3$), ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. Of these examples, particles formed of alumina (alumina particles), particles formed of boehmite (boehmite particles), particles formed of titania (titania particles), and particles formed of barium sulfate (barium sulfate particles) are preferable as the non-conductive particles from a viewpoint of improving close adherence between a heat-resistant layer and a substrate, alumina particles, boehmite particles, and barium sulfate particles are more preferable as the non-conductive particles, and alumina particles and barium sulfate particles are even more preferable as the non-conductive particles.

These particles may be subjected to element substitution, surface treatment, solid solution treatment, or the like as necessary. One of these types of particles may be used individually, or two or more of these types of particles may be used in combination.

Note that the non-conductive organic particles are a different organic compound to the particulate polymer that serves as a binder. In other words, the non-conductive organic particles do not have binding capacity. Preferable examples of non-conductive organic particles include particles of various cross-linked polymers such as cross-linked polymethyl methacrylate, cross-linked polystyrene, cross-linked polydivinylbenzene, cross-linked styrene-divinylbenzene copolymer, polystyrene, polyimide, polyamide, polyamide imide, melamine resin, phenolic resin, and benzoguanamine-formaldehyde condensate; and particles of heat-resistant polymers such as polysulfone, polyacrylonitrile, polyaramid, polyacetal, and thermoplastic polyimide. Moreover, a modified product or derivative of any of the preceding examples can be used as non-conductive organic particles. One of these types of particles may be used individually, or two or more of these types of particles may be used in combination.

The glass-transition temperature of organic particles used as the non-conductive particles is preferably higher than 20° C., and is normally 350° C. or lower. The glass-transition temperature of organic particles can be measured in accordance with JIS K7121.

The volume-average particle diameter of the non-conductive particles is preferably 0.7 µm or less, more preferably 0.5 µm or less, and even more preferably 0.4 µm or less. When the volume-average particle diameter of the non-conductive particles is not more than any of the upper limits set forth above, heat shrinkage resistance of an obtained heat-resistant layer can be increased. Note that the volume-average particle diameter of the non-conductive particles can normally be 0.05 µm or more. The volume-average particle diameter of non-conductive particles can be measured by adopting a laser analysis method in accordance with JIS Z 8825 with respect to non-conductive particles that have been pretreated in accordance with JIS Z 8824.

<Binder Composition>

The binder composition is the presently disclosed binder composition set forth above.

From a viewpoint of inhibiting excessive reduction of air permeability of an obtained heat-resistant layer, the content of the previously described specific particulate polymer in the slurry composition is preferably 10 parts by mass or less, more preferably 8 parts by mass or less, and even more preferably 6 parts by mass or less in terms of solid content per 100 parts by mass of the non-conductive particles. Moreover, from a viewpoint of further increasing peel strength of an obtained heat-resistant layer, the content of the specific particulate polymer in the slurry composition is preferably 1 part by mass or more, more preferably 1.2 parts by mass or more, and even more preferably 1.5 parts by mass or more in terms of solid content per 100 parts by mass of the non-conductive particles. Note that in a case in which the slurry composition contains the subsequently described water-soluble polymer, which is an optional component, the content of the particulate polymer is preferably larger than the content of the water-soluble polymer.

<Other Components>

Examples of other components that may be contained in the slurry composition include, but are not specifically limited to, the same other components as may be contained in the presently disclosed binder composition. One other component may be used individually, or two or more other components may be used in combination in a freely selected ratio.

The content of a water-soluble polymer as an optional component in the slurry composition is preferably 0.5 parts by mass or more, and more preferably 1 part by mass or more in terms of solid content per 100 parts by mass of the non-conductive particles (particularly non-conductive inorganic particles) from a viewpoint of further improving heat shrinkage resistance of an obtained heat-resistant layer. Moreover, the content of a water-soluble polymer as an optional component in the slurry composition is preferably 5 parts by mass or less, and more preferably 4 parts by mass or less in terms of solid content per 100 parts by mass of the non-conductive particles (particularly non-conductive inorganic particles) from a viewpoint of inhibiting excessive reduction of air permeability of an obtained heat-resistant layer.

The content of a previously described wetting agent, which is an optional component in the slurry composition, is preferably 0.01 parts by mass or more per 100 parts by mass of the non-conductive particles (particularly non-conductive inorganic particles), and is preferably 3 parts by mass or less, more preferably 2 parts by mass or less, and even more preferably 1 part by mass or less per 100 parts by mass of the non-conductive particles (particularly non-conductive inorganic particles). When the content of a wetting agent is not less than the lower limit set forth above, peel strength of an obtained heat-resistant layer can be further increased. Moreover, when the content of a wetting agent is not more than any of the upper limits set forth above, cycle characteristics of a secondary battery can be improved.

The content of a previously described dispersant, which is an optional component in the slurry composition, is preferably 0.1 parts by mass or more per 100 parts by mass of the non-conductive particles (particularly non-conductive inorganic particles), and is preferably 3 parts by mass or less, more preferably 2 parts by mass or less, and even more preferably 1 part by mass or less per 100 parts by mass of the non-conductive particles (particularly non-conductive inorganic particles). When the content of a dispersant is not less than the lower limit set forth above, heat shrinkage resistance of a heat-resistant layer can be increased. Moreover, when the content of a dispersant is not more than any of the upper limits set forth above, cycle characteristics of a secondary battery can be improved.

<Production of Slurry Composition for Non-Aqueous Secondary Battery Heat-Resistant Layer>

The slurry composition set forth above can be produced by mixing the above-described components by a known mixing method such as described above in the "Production of binder composition for non-aqueous secondary battery heat-resistant layer" section.

(Heat-Resistant Layer for Non-Aqueous Secondary Battery)

The presently disclosed heat-resistant layer is a layer that is formed from the presently disclosed slurry composition set forth above. For example, the presently disclosed heat-resistant layer can be formed by applying the slurry composition set forth above onto the surface of a suitable substrate to form a coating film, and subsequently drying the coating film that has been formed. In other words, the presently disclosed heat-resistant layer is formed of a dried product of the slurry composition set forth above and normally contains at least non-conductive particles and a particulate polymer. Note that components contained in the heat-resistant layer are components that were contained in the slurry composition set forth above, and thus the preferred ratio of these components is the same as the preferred ratio of the components in the slurry composition.

The presently disclosed heat-resistant layer has sufficiently high peel strength as a result of being formed using the presently disclosed slurry composition containing the presently disclosed binder composition.

<Substrate>

No limitations are placed on the substrate onto which the slurry composition is applied. For example, a coating film of the slurry composition may be formed on the surface of a releasable substrate, this coating film may be dried to form a heat-resistant layer, and then the releasable substrate may be peeled from the heat-resistant layer. The heat-resistant layer that is peeled from the releasable substrate in this manner can be used as a free-standing film in formation of a battery member of a secondary battery.

However, it is preferable that a separator substrate or an electrode substrate is used as the substrate from a viewpoint of raising battery member production efficiency since a step of peeling the heat-resistant layer can be omitted. Specifically, the slurry composition is preferably applied onto a separator substrate or an electrode substrate, and is more preferably applied onto a separator substrate.

<<Separator Substrate>>

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, an aromatic polyamide resin, or the like, and is preferably a microporous membrane or non-woven fabric made from polyethylene due to the excellent strength thereof.

<<Electrode Substrate>>

The electrode substrate (positive electrode substrate or negative electrode substrate) is not specifically limited and may, for example, be an electrode substrate obtained by forming an electrode mixed material layer containing an electrode active material and a binder on a current collector. The current collector, the electrode active material (positive electrode active material or negative electrode active material) and the binder for an electrode mixed material layer (binder for a positive electrode mixed material layer or binder for a negative electrode mixed material layer) in the electrode mixed material layer, and the method by which the electrode mixed material layer is formed on the current collector can be known examples thereof such as any of those described in JP2013-145763A, for example.

<Formation Method of Heat-Resistant Layer>

Examples of methods by which the heat-resistant layer may be formed on a substrate such as the separator substrate or the electrode substrate described above include:

(1) a method in which the presently disclosed slurry composition is applied onto the surface of the substrate (surface at the electrode mixed material layer-side in the case of the electrode substrate; same applies below) and is then dried;

(2) a method in which the substrate is immersed in the presently disclosed slurry composition and is then dried; and (3) a method in which the presently disclosed slurry composition is applied onto a releasable substrate and is dried to produce a heat-resistant layer that is then transferred onto the surface of the substrate.

Of these methods, method (1) is particularly preferable since it allows simple control of the thickness of the heat-resistant layer. In more detail, method (1) includes a step of applying the slurry composition onto the substrate (application step) and a step of drying the slurry composition that has been applied onto the substrate to form a heat-resistant layer (drying step).

<<Application Step>>

Examples of methods by which the slurry composition can be applied onto the substrate in the application step include, but are not specifically limited to, doctor blading, reverse roll coating, direct roll coating, gravure coating, extrusion coating, and brush coating.

<<Drying Step>>

The method by which the slurry composition on the substrate is dried in the drying step may be a commonly known method without any specific limitations. Examples of drying methods that may be used include drying by warm, hot, or low-humidity air, drying in a vacuum, and drying through irradiation with infrared light, electron beams, or the like.

<Thickness of Heat-Resistant Layer>

The thickness of the heat-resistant layer is preferably 4 μm or less, more preferably 3 μm or less, even more preferably 2.5 μm or less, and particularly preferably 2 μm or less. Note that the thickness of the heat-resistant layer may be 0.2 μm or more, for example, but is not specifically limited thereto. When the thickness of the heat-resistant layer is not more than any of the upper limits set forth above, cycle characteristics of an obtained secondary battery can be enhanced. Moreover, when the thickness of the heat-resistant layer is not less than the lower limit set forth above, the heat-resistant layer has excellent heat shrinkage resistance.

(Non-Aqueous Secondary Battery)

The presently disclosed secondary battery includes the presently disclosed heat-resistant layer set forth above. More specifically, the presently disclosed secondary battery includes a positive electrode, a negative electrode, a separator, and an electrolyte solution, and has the heat-resistant layer set forth above included in at least one battery member among the positive electrode, the negative electrode, and the separator.

<Positive Electrode, Negative Electrode, and Separator>

At least one of the positive electrode, the negative electrode, and the separator used in the presently disclosed secondary battery is a battery member that includes the presently disclosed heat-resistant layer set forth above. Note that any known positive electrode, negative electrode, or separator can be used without any specific limitations as a positive electrode, negative electrode, or separator that does not include the presently disclosed heat-resistant layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, LiPF$_6$, LiClO$_4$, and CF$_3$SO$_3$Li are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used in a lithium ion secondary battery, for example, include alkyl carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution may be adjusted as appropriate. Furthermore, known additives such as vinylene carbonate (VC) may be added to the electrolyte solution.

<Production Method of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. Note that at least one member among the positive electrode, the negative electrode, and the separator is a member that is equipped with a heat-resistant layer. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through polymerization of a plurality of types of monomers, the proportion (or mole fraction) in the polymer constituted by a monomer unit that is formed through polymerization of a given monomer is normally, unless otherwise specified, the same as the ratio (charging ratio or mole fraction) of the given monomer among all monomers used in polymerization of the polymer. In the examples and comparative examples, the following methods were used to measure and evaluate various attributes.

<Volume-Average Particle Diameter of Particulate Polymer>

The volume-average particle diameter of a particulate polymer produced in each example or comparative example was measured by laser diffraction. Specifically, a water dispersion (adjusted to a solid content concentration of 0.1 mass %) containing a measurement subject (particulate polymer) was used as a sample. In a particle diameter distribution (by volume) measured using a laser diffraction particle size analyzer (produced by Beckman Coulter Inc.; product name: LS-13 320), the particle diameter D50 at which cumulative volume calculated from a small diameter end of the distribution reached 50% was taken to be the volume-average particle diameter.

<Parameter $M^{OH}/S$>

For a particulate polymer produced in each example or comparative example, a value ($M^{OH}/S$) obtained by dividing a value $M^{OH}$ of the mole fraction of a hydroxyl group-containing monomer unit in the particulate polymer by a value S (μm$^2$) of the surface area of the particulate polymer was calculated by the following formula.

$$M^{OH}/S = (\text{Value } M^{OH} \text{ of mole fraction of hydroxyl group-containing monomer unit in particulate polymer}) \div (4\pi \times (\text{Volume-average particle diameter of particulate polymer}/2)(\mu m)^2)$$

Note that the value $M^{OH}$ of the mole fraction of the hydroxyl group-containing monomer unit was taken to be the mole fraction of a hydroxyl group-containing monomer in a monomer composition that was used to produce the particulate polymer. Also note that that the mole fractions of various other monomer units were calculated in the same way as the value of $M^{OH}$ and are shown in Table 1.

Moreover, as indicated in the preceding formula, the value S (μm$^2$) of the surface area of the particulate polymer was a value calculated using the volume-average particle diameter D50 obtained as previously described under the fictitious assumption that the particulate polymer has a spherical shape.

<Degree of Swelling in Electrolyte Solution>

A particulate polymer produced in each example or comparative example was shaped into the form of a film of approximately 0.1 mm in thickness. An approximately 2 cm square was cut out from this film as a test specimen, and the mass of this test specimen (pre-immersion mass) was measured. Thereafter, the test specimen was immersed in electrolyte solution having a temperature of 60° C. for 72 hours. The immersed test specimen was pulled out of the electrolyte solution, and electrolyte solution was wiped off from the test specimen. Soon thereafter, the mass of the test specimen (post-immersion mass) was measured, and a value for "post-immersion mass/pre-immersion mass" was taken to be the degree of swelling.

Note that the electrolyte solution was a solution obtained by dissolving LiPF$_6$ with a concentration of 1 mol/L in a mixed solvent of ethylene carbonate and ethyl methyl carbonate in a mass ratio of 3:7. A smaller value for the obtained degree of swelling indicates that the particulate polymer has higher electrolyte solution resistance.

<Water Solubility of Particulate Polymer>

For a particulate polymer produced in each example or comparative example, 0.5 g of the polymer was dissolved in 100 g of water at a temperature of 25° C. Insoluble content was confirmed to be 90 mass % or more in all of the examples and comparative examples.

<Close Adherence of Heat-Resistant Layer for Non-Aqueous Secondary Battery>

A heat-resistant layer-equipped separator produced in each example or comparative example was cut out as 10 mm in width and 50 mm in length to obtain a test specimen.

Next, an SUS (stainless steel) plate having double-sided tape (No. 5608 produced by Nitto Denko Corporation) affixed thereto was prepared, and the surface at the heat-resistant layer-side of the test specimen was affixed to the double-sided tape. One end of the separator substrate was pulled and peeled off at a speed of 50 mm/min such that the peeling face was at 180°, and the peel strength when the separator substrate was peeled off was measured and was evaluated in accordance with the following standard. A higher peel strength indicates higher close adherence between a separator substrate and a heat-resistant layer.

- A: Peel strength of 50 N/m or more
- B: Peel strength of not less than 30 N/m and less than 50 N/m
- C: Peel strength of less than 30 N/m <Heat Shrinkage Resistance of Heat-Resistant Layer for Non-Aqueous Secondary Battery>

A heat-resistant layer-equipped separator produced in each example or comparative example was cut out as a square of 12 cm in width by 12 cm in length, and a square having a side length of 10 cm was drawn in an inner part of the cut out square to obtain a test specimen. The test specimen was placed inside a 150° C. thermostatic tank and was left for 1 hour. Thereafter, the area change of the square drawn in the inner part (={(area of square before being left−area of square after being left)/area of square before being left}×100%) was determined as the heat shrinkage rate and was evaluated by the following standard. A smaller heat shrinkage rate indicates that a heat-resistant layer has better heat shrinkage resistance.

- A: Heat shrinkage rate of less than 10%
- B: Heat shrinkage rate of not less than 10% and less than 20%
- C: Heat shrinkage rate of 20% or more <Cycle Characteristics of Non-Aqueous Secondary Battery>

A lithium ion secondary battery produced in each example or comparative example was left at rest in a 25° C. environment for 24 hours. The lithium ion secondary battery was subsequently subjected to an operation of charging to 4.2 V by a constant current-constant voltage (CC-CV) method at a charge rate of 1 C (cut-off condition: 0.02 C) and discharging to 3.0 V by a constant current (CC) method at a discharge rate of 1 C at 25° C., and the initial capacity C0 was measured.

The lithium ion secondary battery was also repeatedly subjected to the same charge/discharge operation in a 25° C. environment, and the capacity C1 after 300 cycles was measured. The capacity maintenance rate $\Delta C (= (C1/C0) \times 100$ (%)) was calculated and was evaluated by the following standard. A higher capacity maintenance rate indicates a smaller decrease of discharge capacity, and thus indicates better cycle characteristics.

- A: Capacity maintenance rate $\Delta C$ of 85% or more
- B: Capacity maintenance rate $\Delta C$ of not less than 75% and less than 85%
- C: Capacity maintenance rate $\Delta C$ of less than 75%

Example 1

<Production of Water Dispersion Containing Particulate Polymer A>

A reactor including a stirrer was supplied with 90 parts of deionized water, 0.05 parts of sodium dodecylbenzenesulfonate (NEOPELEX G-15 produced by Kao Corporation) as an emulsifier, and 0.23 parts of ammonium persulfate, the gas phase was purged with nitrogen gas, and the temperature was raised to 70° C.

Meanwhile, a monomer composition was obtained in a separate vessel by mixing 50 parts of deionized water, 0.1 parts of sodium dodecylbenzenesulfonate as an emulsifier, 2.2 parts of acrylonitrile (AN) as a cyano group-containing monomer, 2.5 parts of N-methylolacrylamide (NMA) as a hydroxyl group-containing monomer, and 92.0 parts of n-butyl acrylate (BA), 2.1 parts of methacrylic acid (MAA), and 1.2 parts of acrylamide (AAm) as other monomers. The monomer composition was continuously added into the reactor over 4 hours to carry out polymerization. The reaction was carried out at 80° C. during the addition. Once the addition was complete, a further 3 hours of stirring was performed at 80° C. to complete the reaction and thereby yield a water dispersion (binder composition for a heat-resistant layer) containing a particulate polymer A. The volume-average particle diameter, parameter $M^{OH}/S$, and degree of swelling in electrolyte solution of the obtained particulate polymer A were measured or calculated as previously described. The results are shown in Table 1. Note that the obtained particulate polymer A was a (meth)acrylic acid ester copolymer (ACL) in which the mole fraction of a butyl acrylate unit, which is an acrylic acid ester monomer unit, was 0.87.

<Production of Slurry Composition for Heat-Resistant Layer>

Alumina particles (AKP-30 produced by Sumitomo Chemical Co., Ltd.; volume-average particle diameter D50 (catalog value): 0.3 μm) were used as non-conductive particles, sodium polyacrylate (ARON T-50 produced by Toagosei Co., Ltd.) was used as a dispersant, and carboxymethyl cellulose having a degree of etherification of 0.8 to 1.0 (D1220 produced by Daicel FineChem Ltd.) was used as a water-soluble polymer. Note that the viscosity of a 1% aqueous solution of the water-soluble polymer was 10 mPa·s to 20 mPa·s.

A dispersion liquid was obtained by mixing 100 parts of the non-conductive particles, 0.5 parts of the dispersant, and deionized water and then treating these materials for 1 hour using a bead mill (LMZ015 produced by Ashizawa Finetech Ltd.). A slurry composition for a heat-resistant layer having a solid content concentration of 40 mass % was then produced by mixing the binder composition for a heat-resistant layer produced as described above in an amount such as to be 4 parts in terms of solid content of the particulate polymer A, a 4% aqueous solution of carboxymethyl cellulose in an amount such as to be 1.5 parts in terms of solid content, and 0.3 parts of an ethylene oxide/propylene oxide surfactant (NOPTECHS ED-052 produced by San Nopco Limited) as a wetting agent.

<Production of Heat-Resistant Layer-Equipped Separator Including Heat-Resistant Layer at One Side>

A separator substrate made of polyethylene (ND509 produced by Asahi Kasei Corporation; thickness: 9 μm) was prepared. The slurry composition for a heat-resistant layer produced as described above was applied onto the surface of the prepared separator substrate and was dried at a temperature of 50° C. for 3 minutes to obtain a heat-resistant layer-equipped separator including a heat-resistant layer at one side (heat-resistant layer thickness: 2 μm). The heat-resistant layer-equipped separator that was obtained was used to evaluate close adherence and heat shrinkage resistance of the heat-resistant layer as previously described. The results are shown in Table 1.

<Production of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The polymerization reaction was quenched by cooling at the point at which the polymerization conversion rate reached 96% to yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to yield a water dispersion containing a binder for a negative electrode.

A planetary mixer was charged with 48.75 parts of artificial graphite (theoretical capacity: 360 mAh/g) and 48.75 parts of natural graphite (theoretical capacity: 360 mAh/g) as negative electrode active materials and 1 part in terms of solid content of carboxymethyl cellulose as a thickener. These materials were diluted to a solid content concentration of 60% with deionized water and were subsequently kneaded at a rotation speed of 45 rpm for 60 minutes. Thereafter, 1.5 parts in terms of solid content of the binder for a negative electrode obtained as described above was added and was kneaded therewith at a rotation speed of 40 rpm for 40 minutes. The viscosity was then adjusted to 3,000±500 mPa·s (measured by B-type viscometer at 25° C. and 60 rpm) with deionized water to produce a slurry composition for a negative electrode mixed material layer.

The slurry composition for a negative electrode mixed material layer was applied onto the surface of copper foil of 15 μm in thickness serving as a current collector by a comma coater such as to have a coating weight of 11±0.5 mg/cm$^2$. The copper foil having the slurry composition for a negative electrode mixed material layer applied thereon was subsequently conveyed inside an oven having a temperature of 80° C. for 2 minutes and an oven having a temperature of 110° C. for 2 minutes at a speed of 400 mm/min so as to dry the slurry composition on the copper foil and thereby obtain a negative electrode web having a negative electrode mixed material layer formed on the current collector.

Thereafter, the negative electrode mixed material layer-side of the produced negative electrode web was roll pressed with a line pressure of 11 t (tons) in an environment having a temperature of 25±3° C. to obtain a negative electrode having a negative electrode mixed material layer density of 1.60 g/cm$^3$. The negative electrode was subsequently left in an environment having a temperature of 25±3° C. and a relative humidity of 50±5% for 1 week.

<Production of Positive Electrode>

A slurry composition for a positive electrode mixed material layer was produced by loading 96 parts of an active material NMC111 (LiNi$_{1/3}$Co$_{1/3}$Mn$_{1/3}$O$_2$) based on a lithium complex oxide of Co—Ni—Mn as a positive electrode active material, 2 parts of acetylene black (HS-100 produced by Denka Company Limited) as a conductive material, and 2 parts of polyvinylidene fluoride (KF-1100 produced by Kureha Corporation) as a binder into a planetary mixer, further adding N-methyl-2-pyrrolidone (NMP) as a dispersion medium to adjust the total solid content concentration to 67%, and mixing these materials.

Next, the obtained slurry composition for a positive electrode mixed material layer was applied onto aluminum foil of 20 μm in thickness serving as a current collector by a comma coater such as to have a coating weight of 20±0.5 mg/cm$^2$.

The aluminum foil was conveyed inside an oven having a temperature of 90° C. for 2 minutes and an oven having a temperature of 120° C. for 2 minutes at a speed of 200 mm/min so as to dry the slurry composition on the aluminum foil and thereby obtain a positive electrode web having a positive electrode mixed material layer formed on the current collector.

Thereafter, the positive electrode mixed material layer-side of the produced positive electrode web was roll pressed with a line pressure of 14 t (tons) in an environment having a temperature of 25±3° C. to obtain a positive electrode having a positive electrode mixed material layer density of 3.40 g/cm$^3$. The positive electrode was subsequently left in an environment having a temperature of 25±3° C. and a relative humidity of 50±5% for 1 week.

<Production of Secondary Battery>

The negative electrode, positive electrode, and separator were used to produce a wound cell (discharge capacity equivalent to 520 mAh) and were arranged inside aluminum packing. The inside of the aluminum packing was subsequently filled with LiPF$_6$ solution of 1.0 M in concentration (solvent:mixed solvent of ethylene carbonate (EC)/ethyl methyl carbonate (EMC)=3/7 (mass ratio); additive:containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. This lithium ion secondary battery was used to evaluate cycle characteristics. The result is shown in Table 1.

Examples 2 to 7, 9, and 11

Various operations, measurements, and evaluations were performed in the same way as in Example 1 with the exception that in synthesis of a particulate polymer, the chemical composition of the monomer composition used in polymerization, etc., were changed as necessary such that the types and mole fractions of monomer units in the obtained particulate polymer, the particle diameter of the particulate polymer, and the degree of swelling in electrolyte solution of the particulate polymer were as shown in Table 1. The results are shown in Table 1.

Note that in Table 1, particulate polymers produced in these examples that differed in terms of chemical composition, etc., from Example 1 are denoted as particulate polymers B to G, H, and J, respectively.

Also note that in Table 1, the rows indicating the type and mole fraction of a hydroxyl group-containing monomer unit in Examples 7 and 10 are denoted as "NMA/β-HEA" and "0.03/0.05", respectively. "NMA/β-HEA" indicating the type means that the particulate polymer included an N-methylolacrylamide unit and a β-hydroxyethyl acrylate unit (i.e., included two types) and "0.03/0.05" indicating the mole fraction means that the mole fraction of the N-methylolacrylamide unit was 0.03 and the mole fraction of the β-hydroxyethyl acrylate unit was 0.05.

Example 8

Various operations, measurements, and evaluations were performed in the same way as in Example 1 with the exception that in the "Production of slurry composition for heat-resistant layer" step, the used non-conductive particles were changed from alumina particles to barium sulfate particles (TS-2 produced by Takehara Kagaku Kogyo Co., Ltd.; volume-average particle diameter D50 (catalog value): 0.3 μm). The results are shown in Table 1.

Example 10

In synthesis of a particulate polymer I, polymerization conditions were changed from conditions in production of the particulate polymer G in Example 7 (specifically, the amount of emulsifier charged to the reactor was changed to 0.02 parts). With the exception of this point, various operations, measurements, and evaluations were performed in the same way as in Example 7. The results are shown in Table 1.

Example 12

Various operations, measurements, and evaluations were performed in the same way as in Example 1 with the exception that in the "Production of slurry composition for heat-resistant layer" step, alumina particles having a larger diameter (AKP-3000 produced by Sumitomo Chemical Co., Ltd.; volume-average particle diameter D50 (catalog value): 0.7 μm) were used as non-conductive particles. The results are shown in Table 1.

Comparative Example 1

Various operations, measurements, and evaluations were performed in the same way as in Example 1 with the exception that the chemical composition of the monomer composition, etc., in synthesis of a particulate polymer were changed as necessary such that the value of the parameter $M^{OH}/S$ for the obtained particulate polymer was less than 0.4. The results are shown in Table 1. Note that the particulate polymer produced in this comparative example is denoted as particulate polymer K in Table 1.

Comparative Example 2

Various operations, measurements, and evaluations were performed in the same way as in Example 1 with the exception that the chemical composition of the monomer composition, etc., in synthesis of a particulate polymer were changed as necessary such that the obtained particulate polymer did not include a cyano group-containing monomer unit. The results are shown in Table 1. Note that the particulate polymer produced in this comparative example is denoted as particulate polymer L in Table 1.

Comparative Example 3

Various operations, measurements, and evaluations were performed in the same way as in Example 1 with the exception that the chemical composition of the monomer composition, etc., in synthesis of a particulate polymer were changed as necessary such that the obtained particulate polymer did not include a hydroxyl group-containing monomer unit and such that the value of the parameter $M^{OH}/S$ for the obtained particulate polymer was of course 0. The results are shown in Table 1. Note that the particulate polymer produced in this comparative example is denoted as particulate polymer M in Table 1.

Comparative Example 4

<Production of Water Dispersion Containing Particulate Polymer N>

A reactor including a stirrer was supplied with 70 parts of deionized water, 0.15 parts of sodium lauryl sulfate (EMAL 2F produced by Kao Corporation) as an emulsifier, and 0.5 parts of ammonium persulfate, the gas phase was purged with nitrogen gas, and the temperature was raised to 60° C.

Meanwhile, 50 parts of deionized water, 0.5 parts of sodium dodecylbenzenesulfonate as an emulsifier, 1.2 parts of N-methylolacrylamide as a hydroxyl group-containing monomer, 2 parts of acrylonitrile as a cyano group-containing monomer, and 93.8 parts of n-butyl acrylate, 2 parts of methacrylic acid, and 1 part of allyl glycidyl ether as other monomers were added into a separate vessel, and 0.15 parts of a chelating agent (Chelest 400G produced by Chelest Corporation; tetrasodium ethylenediaminetetraacetate tetrahydrate) was further mixed therewith to obtain a monomer composition. The monomer composition was continuously added into the reactor over 4 hours to carry out polymerization. The reaction was carried out at 60° C. during the addition. Once the addition was complete, a further 3 hours of stirring was performed at 70° C. to complete the reaction and thereby yield a water dispersion (binder composition for a heat-resistant layer) containing a particulate polymer N.

<Production of Slurry Composition for Heat-Resistant Layer Through to Production of Secondary Battery>

Various operations, measurements, and evaluations were performed in the same way as in Example 1 for subsequent steps with the exception that the binder composition for a heat-resistant layer obtained as described above was used. The results are shown in Table 1.

In Table 1, shown below:
"AN" indicates acrylonitrile unit;
"NMA" indicates N-methylolacrylamide unit;
"BA" indicates n-butyl acrylate unit;
"MAA" indicates methacrylic acid unit;
"Aam" indicates acrylamide unit;
"CMC" indicates carboxymethyl cellulose;
"β-HEA" indicates β-hydroxyethyl acrylate unit;
"AMA" indicates allyl methacrylate unit;
"HEMA" indicates hydroxyethyl methacrylate unit;
"MAN" indicates methacrylonitrile unit;
"2EHA" indicates 2-ethylhexyl acrylate unit;
"St" indicates styrene unit;
"AGE" indicates allyl glycidyl ether unit;
"$Al_2O_3$" indicates alumina particles; and
"$BaSO_4$" indicates barium sulfate particles.

TABLE 1

| | | | | Examples | | | | | | | |
|---|---|---|---|---|---|---|---|---|---|---|---|
| | | | | 1 | 2 | 3 | 4 | 5 | 6 | 7 | 8 |
| Slurry composition for heat-resistant layer | Particulate polymer | Type | | A | B | C | D | E | F | G | A |
| | | Cyano group-containing monomer unit | Type | AN | AN | AN | AN | AN | MAN | AN | AN |
| | | | Mole fraction (—) | 0.05 | 0.05 | 0.05 | 0.05 | 0.05 | 0.05 | 0.05 | 0.05 |
| | | Hydroxyl group-containing monomer unit | Type | NMA | NMA | β-HEA | HEMA | HEMA | NMA | NMA/β-HEA | NMA |
| | | | Mole fraction (—) | 0.03 | 0.021 | 0.03 | 0.03 | 0.03 | 0.03 | 0.03/0.05 | 0.03 |

TABLE 1-continued

|  |  |  |  |  |  |  |  |  |  |  |
|---|---|---|---|---|---|---|---|---|---|---|
|  |  | Other monomer unit 1 | Type | BA | BA | BA | BA | BA | BA | BA | BA |
|  |  |  | Mole fraction (—) | 0.87 | 0.879 | 0.88 | 0.88 | 0.89 | 0.87 | 0.82 | 0.87 |
|  |  | Other monomer unit 2 | Type | MAA | MAA | MAA | MAA | MAA | MAA | MAA | MAA |
|  |  |  | Mole fraction (—) | 0.03 | 0.03 | 0.03 | 0.03 | 0.03 | 0.03 | 0.03 | 0.03 |
|  |  | Other monomer unit 3 | Type | Aam | Aam | AMA | AMA | — | Aam | Aam | Aam |
|  |  |  | Mole fraction (—) | 0.02 | 0.02 | 0.01 | 0.01 | — | 0.02 | 0.02 | 0.02 |
|  |  | Parameter $M^{OH}/S$ (—) |  | 0.57 | 0.40 | 0.57 | 0.57 | 0.57 | 0.57 | 1.51 | 0.49 |
|  |  | Volume-average particle diameter (μm) |  | 0.13 | 0.13 | 0.13 | 0.13 | 0.13 | 0.13 | 0.13 | 0.14 |
|  |  | Degree of swelling (factor) |  | 3.9 | 3.7 | 3.5 | 3.5 | 8 | 4 | 3.9 | 3.9 |
|  |  | Amount (parts by mass) |  | 4 | 4 | 4 | 4 | 4 | 4 | 4 | 4 |
|  | Water-soluble polymer | Type |  | CMC | CMC | CMC | CMC | CMC | CMC | CMC | CMC |
|  |  | Amount (parts by mass) |  | 1.5 | 1.5 | 1.5 | 1.5 | 1.5 | 1.5 | 1.5 | 1.5 |
|  | Non-conductive inorganic particles | Type |  | $Al_2O_3$ | $Al_2O_3$ | $Al_2O_3$ | $Al_2O_3$ | $Al_2O_3$ | $Al_2O_3$ | $Al_2O_3$ | $BaSO_4$ |
|  |  | Volume-average particle diameter (μm) |  | 0.3 | 0.3 | 0.3 | 0.3 | 0.3 | 0.3 | 0.3 | 0.3 |
|  |  | Amount (parts by mass) |  | 100 | 100 | 100 | 100 | 100 | 100 | 100 | 100 |
| Heat-resistant layer | Thickness (μm) |  |  | 2 | 2 | 2 | 2 | 2 | 2 | 2 | 2 |
| Evaluation | Close adherence |  |  | A | A | A | A | A | A | A | A |
|  | Heat shrinkage resistance |  |  | A | A | A | A | A | A | A | A |
|  | Cycle characteristics |  |  | A | B | A | A | B | A | A | A |

|  |  |  |  | Examples | | | | Comparative examples | | | |
|---|---|---|---|---|---|---|---|---|---|---|---|
|  |  |  |  | 9 | 10 | 11 | 12 | 1 | 2 | 3 | 4 |
| Slurry composition for heat-resistant layer | Particulate polymer | Type |  | H | I | J | A | K | L | M | N |
|  |  | Cyano group-containing monomer unit | Type | AN | AN | AN | AN | AN | — | AN | AN |
|  |  |  | Mole fraction (—) | 0.05 | 0.05 | 0.07 | 0.05 | 0.05 | — | 0.05 | 0.046 |
|  |  | Hydroxyl group-containing monomer unit | Type | NMA | NMA/β-HEA | NMA | NMA | NMA | NMA | — | NMA |
|  |  |  | Mole fraction (—) | 0.03 | 0.03/0.05 | 0.02 | 0.03 | 0.015 | 0.03 | — | 0.015 |
|  |  | Other monomer unit 1 | Type | 2EHA | BA | BA | BA | BA | BA | BA | BA |
|  |  |  | Mole fraction (—) | 0.65 | 0.82 | 0.86 | 0.87 | 0.885 | 0.92 | 0.90 | 0.899 |
|  |  | Other monomer unit 2 | Type | St | MAA | MAA | MAA | MAA | MAA | MAA | MAA |
|  |  |  | Mole fraction (—) | 0.25 | 0.03 | 0.03 | 0.03 | 0.03 | 0.03 | 0.03 | 0.029 |
|  |  | Other monomer unit 3 | Type | Aam | Aam | Aam | Aam | Aam | Aam | AMA | AGE |
|  |  |  | Mole fraction (—) | 0.02 | 0.02 | 0.02 | 0.02 | 0.02 | 0.02 | 0.02 | 0.011 |
|  |  | Parameter $M^{OH}/S$ (—) |  | 0.49 | 0.41 | 0.44 | 0.49 | 0.24 | 0.49 | 0 | 0.08 |
|  |  | Volume-average particle diameter (μm) |  | 0.14 | 0.25 | 0.12 | 0.14 | 0.14 | 0.14 | 0.14 | 0.24 |
|  |  | Degree of swelling (factor) |  | 1.8 | 4.5 | 5 | 3.9 | 3.9 | 3.9 | 3.9 | 3.8 |
|  |  | Amount (parts by mass) |  | 4 | 4 | 4 | 4 | 4 | 4 | 4 | 4 |
|  | Water-soluble polymer | Type |  | CMC | CMC | CMC | CMC | CMC | CMC | CMC | CMC |
|  |  | Amount (parts by mass) |  | 1.5 | 1.5 | 1.5 | 1.5 | 1.5 | 1.5 | 1.5 | 1.5 |
|  | Non-conductive inorganic particles | Type |  | $Al_2O_3$ | $Al_2O_3$ | $Al_2O_3$ | $Al_2O_3$ | $Al_2O_3$ | $Al_2O_3$ | $Al_2O_3$ | $Al_2O_3$ |
|  |  | Volume-average particle diameter (μm) |  | 0.3 | 0.3 | 0.3 | 0.7 | 0.3 | 0.3 | 0.3 | 0.3 |
|  |  | Amount (parts by mass) |  | 100 | 100 | 100 | 100 | 100 | 100 | 100 | 100 |
| Heat-resistant layer | Thickness (μm) |  |  | 2 | 2 | 2 | 2 | 2 | 2 | 2 | 2 |
| Evaluation | Close adherence |  |  | A | A | A | A | C | C | C | C |
|  | Heat shrinkage resistance |  |  | A | B | B | B | C | C | A | A |
|  | Cycle characteristics |  |  | A | A | B | A | B | B | C | C |

It can be seen from Table 1 that a heat-resistant layer having sufficiently high peel strength and capable of displaying high close adherence with a substrate was obtained in each of Examples 1 to 12 in which the used binder composition contained a particulate polymer that included a cyano group-containing monomer unit and a hydroxyl group-containing monomer unit and for which the value of the specific parameter $M^{OH}/S$ was 0.40 or more. It can also be seen that the heat-resistant layers of Examples 1 to 12 were capable of causing a secondary battery to display excellent cycle characteristics.

On the other hand, it can be seen that a heat-resistant layer having sufficiently high peel strength could not be formed and close adherence of the heat-resistant layer with a substrate was insufficient in each of Comparative Examples 1 to 4 in which the used binder composition contained a particulate polymer that did not include at least one of a cyano group-containing monomer unit and a hydroxyl group-containing monomer unit and/or for which the value of the specific parameter $M^{OH}/S$ was less than 0.40.

INDUSTRIAL APPLICABILITY

According to the present disclosure, it is possible to provide a binder composition for a non-aqueous secondary battery heat-resistant layer with which it is possible to produce a slurry composition for a non-aqueous secondary battery heat-resistant layer that can form a heat-resistant layer for a non-aqueous secondary battery having sufficiently high peel strength.

Moreover, according to the present disclosure, it is possible to provide a slurry composition for a non-aqueous secondary battery heat-resistant layer that can form a heat-resistant layer for a non-aqueous secondary battery having sufficiently high peel strength.

Furthermore, according to the present disclosure, it is possible to provide a heat-resistant layer for a non-aqueous secondary battery having sufficiently high peel strength and a non-aqueous secondary battery including the heat-resistant layer.

The invention claimed is:

1. A binder composition for a non-aqueous secondary battery heat-resistant layer comprising a particulate polymer, wherein
the particulate polymer includes a cyano group-containing monomer unit, a hydroxyl group-containing monomer unit, and a (meth)acrylic acid ester monomer unit,
a value $M^{OH}/S$ obtained by dividing a value $M^{OH}$ of a mole fraction of the hydroxyl group-containing monomer unit in the particulate polymer by a value S of surface area of the particulate polymer in units of $\mu m^2$ is 0.40 or more and 1.51 or less,
a mole fraction of the (meth)acrylic acid ester monomer unit in the particulate polymer is more than 0.5, and
a mole fraction of the cyano group-containing monomer unit in the particulate polymer is 0.07 or less.

2. The binder composition for a non-aqueous secondary battery heat-resistant layer according to claim 1, wherein
the particulate polymer has a volume-average particle diameter of 0.30 μm or less, and
the mole fraction of the hydroxyl group-containing monomer unit in the particulate polymer is 0.02 or more.

3. The binder composition for a non-aqueous secondary battery heat-resistant layer according to claim 1, wherein the particulate polymer has a degree of swelling in electrolyte solution of a factor of 8.0 or less.

4. A slurry composition for a non-aqueous secondary battery heat-resistant layer comprising: non-conductive particles; and the binder composition for a non-aqueous secondary battery heat-resistant layer according to claim 1.

5. The slurry composition for a non-aqueous secondary battery heat-resistant layer according to claim 4, wherein the non-conductive particles have a volume-average particle diameter of 0.7 μm or less.

6. A heat-resistant layer for a non-aqueous secondary battery formed using the slurry composition for a non-aqueous secondary battery heat-resistant layer according to claim 4.

7. A non-aqueous secondary battery comprising the heat-resistant layer for a non-aqueous secondary battery according to claim 6.

* * * * *